US010109126B2

(12) United States Patent
Chiu

(10) Patent No.: US 10,109,126 B2
(45) Date of Patent: Oct. 23, 2018

(54) BIOLOGICAL RECOGNITION LOCK SYSTEM

(71) Applicant: Chi-Wei Chiu, Taoyuan (TW)

(72) Inventor: Chi-Wei Chiu, Taoyuan (TW)

( * ) Notice: Subject to any disclaimer, the term of this patent is extended or adjusted under 35 U.S.C. 154(b) by 360 days.

(21) Appl. No.: 14/993,619

(22) Filed: Jan. 12, 2016

(65) Prior Publication Data

US 2017/0200337 A1 Jul. 13, 2017

(51) Int. Cl.
*G06F 21/32* (2013.01)
*G07C 9/00* (2006.01)
*G06K 9/00* (2006.01)
*H04N 7/18* (2006.01)
*H04N 5/232* (2006.01)
*G06K 9/20* (2006.01)
*H04N 5/225* (2006.01)

(52) U.S. Cl.
CPC ..... *G07C 9/00563* (2013.01); *G06K 9/00255* (2013.01); *G06K 9/00604* (2013.01); *G06K 9/209* (2013.01); *G07C 9/00158* (2013.01); *G07C 9/00309* (2013.01); *G07C 9/00571* (2013.01); *H04N 5/2254* (2013.01); *H04N 5/23296* (2013.01); *H04N 7/186* (2013.01); *G06K 9/00295* (2013.01); *G07C 2209/63* (2013.01)

(58) Field of Classification Search
CPC ............ G07C 9/00563; G07C 9/00309; G07C 9/00571; G07C 9/00158; G07C 2209/63; H04N 7/186; H04N 5/23296; G06K 9/00604; G06K 9/00255
See application file for complete search history.

(56) References Cited

U.S. PATENT DOCUMENTS

| | | | | |
|---|---|---|---|---|
| 5,406,345 A * | 4/1995 | Hirasawa | ............... | G02B 7/102 396/86 |
| 9,739,083 B2 * | 8/2017 | Hermann | ............... | A47B 67/02 |
| 2002/0030755 A1* | 3/2002 | Uchino | ............... | H04N 5/2254 348/342 |
| 2003/0093805 A1* | 5/2003 | Gin | .................. | G08B 13/19619 725/105 |
| 2006/0093183 A1* | 5/2006 | Hosoi | ................ | G06K 9/00255 382/103 |
| 2008/0292144 A1* | 11/2008 | Kim | .................... | G06K 9/00604 382/117 |

(Continued)

*Primary Examiner* — Sathyanaraya V Perungavoor
*Assistant Examiner* — Howard D Brown, Jr.
(74) *Attorney, Agent, or Firm* — Rabin & Berdo, P.C.

(57) ABSTRACT

Disclosed is a biological recognition lock system including a wireless control lock and a biological recognition host. The wireless control lock includes a lock body and a wireless receiving unit, and the biological recognition host includes a camera unit, an image processing control unit, an image database and a wireless transmitting unit. The image processing control unit electrically connects and controls the camera unit, the image database and the wireless transmitting unit to determine identification so as to wireless open the wireless control lock. The image database includes recognition images for comparison and the camera unit has variable-focus and tracking feature, and includes a camera module, a color filter, an infrared filter and a filter switching part. Thus, the present invention implements a function of biological recognition lock through a face or iris recognition with the color or infrared images.

10 Claims, 3 Drawing Sheets

(56) References Cited

U.S. PATENT DOCUMENTS

| | | | |
|---|---|---|---|
| 2011/0187874 A1* | 8/2011 | Kikuchi | G06T 5/006 348/207.1 |
| 2013/0182915 A1 | 7/2013 | Hanna | |
| 2013/0265483 A1* | 10/2013 | Tamaki | H04N 5/23212 348/349 |
| 2014/0099005 A1* | 4/2014 | Mogi | G06K 9/00288 382/118 |
| 2014/0112550 A1 | 4/2014 | Hanna | |
| 2015/0016692 A1 | 1/2015 | Hanna et al. | |
| 2015/0310272 A1* | 10/2015 | Wang | G06K 9/00604 348/78 |
| 2015/0317464 A1* | 11/2015 | Willis | H04N 5/23219 348/78 |
| 2016/0092724 A1* | 3/2016 | Jeong | G06K 9/00288 348/77 |

* cited by examiner

BIOLOGICAL RECOGNITION LOCK SYSTEM

BACKGROUND OF THE INVENTION

1. Field of the Invention

The present invention generally relates to a biological recognition lock system, and more specifically to a biological recognition lock system employing a biological recognition host to wireless open a wireless control lock, particularly, an image processing control unit of the biological recognition host performing face recognition to determine if an image signal includes a face image and further processing iris recognition to compare the image signal and any one recognition image stored in an image database so as to determine if identity is authorized, thereby improving correctness of recognition.

2. The Prior Arts

As the application of smart home facilities to security monitoring and access control system became more and more popular, many powerful recognition apparatus have been continuously developed by the related manufactures, particularly, the electronic door lock. The current electronic door lock primarily employs the infrared sensor, Bluetooth wireless transmission or various radio frequency (RF) signal as the transmission medium, like proximity or remote sensing key or card. However, the above solution still undergoes some risk due to missing or illegal duplication.

Additionally, some manufactures even employ the biological method to increase overall correctness of recognition and reliability in the actual operation. In the technology of biological recognition, one of the most commonly used is fingerprint recognition. However, fingerprint is easily duplicated, and it is well known that nearly 10% of the people in the world inherently lack recognizable fingerprint. As a result, the application of fingerprint recognition is difficult and very limited.

Therefore, it is greatly needed to provide a new biological recognition lock system employing a biological recognition host to wireless open a wireless control lock so as to implement a function of biological recognition lock. Particularly, an image processing control unit of the biological recognition host performs face recognition to determine if the image signal has a face image, and performs iris recognition to compare the image signal and the recognition images stored in an image database to determine if identity is authorized, thereby greatly improving correctness of recognition and overcoming the above problems in the prior arts.

SUMMARY OF THE INVENTION

The primary objective of the present invention is to provide a biological recognition lock system comprising a wireless control lock and a biological recognition host through wireless communication like BLE, Wi-Fi, and Zigbee. The wireless control lock can be provided on the door or wall, and the biological recognition host is configured at the entrance or checkpoint to implement the function of discrete or remote entry access control. The wireless control lock comprises a lock body and a wireless receiving unit, and the wireless receiving unit is electrically connected to the lock body for wirelessly receiving a wireless unlock signal to switch a lock closed state to an unlock open state of the lock body. In other words, the wireless control lock is unlocked or opened in a wireless manner.

The above biological recognition host comprises a camera unit, an image processing control unit, an image database and a wireless transmitting unit. The camera unit, the image processing control unit and the wireless transmitting unit are accommodated in a shell body for insulation and protection. Additionally, the image database stores a plurality of recognition images for comparison, and the image processing control unit is electrically connected to the camera unit, the image database and the wireless transmitting unit for controlling the operation.

The camera unit comprises a camera module, a color filter, an infrared filter and a filter switching part. The filter switching part switches the color filter or the infrared filter based on a filter switching signal generated by the image processing control unit so as to align with the camera module and cause an image light incident onto the camera module.

The above camera module comprises color image sensors, infrared image sensors, a zoom lens set and a zoom part. The color image sensors or the infrared image sensors generate an image signal after sensing the image light incident onto the camera module. The image processing control unit receives the image signal to perform face recognition and/or employs the recognition images stored in the image database to perform iris recognition. During the face recognition, the image processing control unit recognizes and determines if the image signal includes a face, like any face aspect. Moreover, during the face recognition and/or iris recognition, the image processing control unit controls the zoom part to adjust a focal length of the zoom lens set for the image signal to focus. Also, the image signal is further processed by a zoom in/out process to implement an optical zoom in/out treatment.

During the face recognition performed, the image processing control unit selects the color filter or the infrared filter through the filter switching signal for the camera module. When the image processing control unit performs the iris recognition, the filter switching signal is used to select the infrared filter for the camera module.

The recognition images stored in the image database are provided for the iris recognition to compare with the image signal, and when the image signal matches any one of the recognition images, an unlock signal is generated and transmitted. Then, the wireless transmitting unit receives the unlock signal to generate and wireless transmit the wireless unlock signal to the wireless receiving unit of the wireless control lock so as to unlock or open the lock body.

In addition, another objective of the present invention is to provide a biological recognition lock system comprising a wireless control lock and a biological recognition host, and the wireless control lock comprises a lock body and a wireless receiving unit electrically connected to the lock body for wirelessly receiving a wireless unlock signal to unlock or open the wireless control lock.

The biological recognition host comprises a camera unit, an image processing control unit, an image database and a wireless transmitting unit. The image processing control unit is electrically connected to the camera unit, the image database and the wireless transmitting unit for controlling the operation. The camera unit comprises at least two camera modules, a color filter, an infrared filter and a filter switching part. The at least two camera modules comprises at least one color camera module and an infrared camera module. Specifically, the color filter and the infrared filter align with the color camera module and the infrared camera module, respectively. Thus, an image light passing through the color filter and the infrared filter, respectively, is incident onto the color camera module and the infrared camera module.

The above color camera module comprises color image sensors, a zoom lens set and a zoom part, and similarly, the infrared camera module comprises infrared image sensors, a zoom lens set and a zoom part. Therefore, the image light incident onto the color camera module or the infrared camera module is sensed by the color image sensors and the infrared image sensors to generate an image signal, respectively, and the image processing control unit receives the image signal to perform face recognition and/or iris recognition. Additionally, the image processing control unit provides the focusing function. More specifically, the image processing control unit implements the face recognition by use of the image signal from the color camera module and/or the infrared camera module, and the iris recognition is implemented by use of the image signal from the infrared camera module.

Accordingly, when the image processing control unit recognizes the image signal, an unlock signal is generated and transmitted. The wireless transmitting unit receives the unlock signal to generate and wirelessly transmit the wireless unlock signal to the wireless receiving unit so as to unlock or open the wireless control lock.

Therefore, the present invention specifically implements the function of wirelessly open the wireless control lock by use of the biological recognition host. In particular, the image processing control unit of the biological recognition host performs the face recognition to determine if the image signal has the face image, and further proceeds the iris recognition to compare the image signal with the recognition imaged stored in the image database so as to determine if identity is authorized, thereby greatly increasing correctness of recognition and applicable to any occasion for access control.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
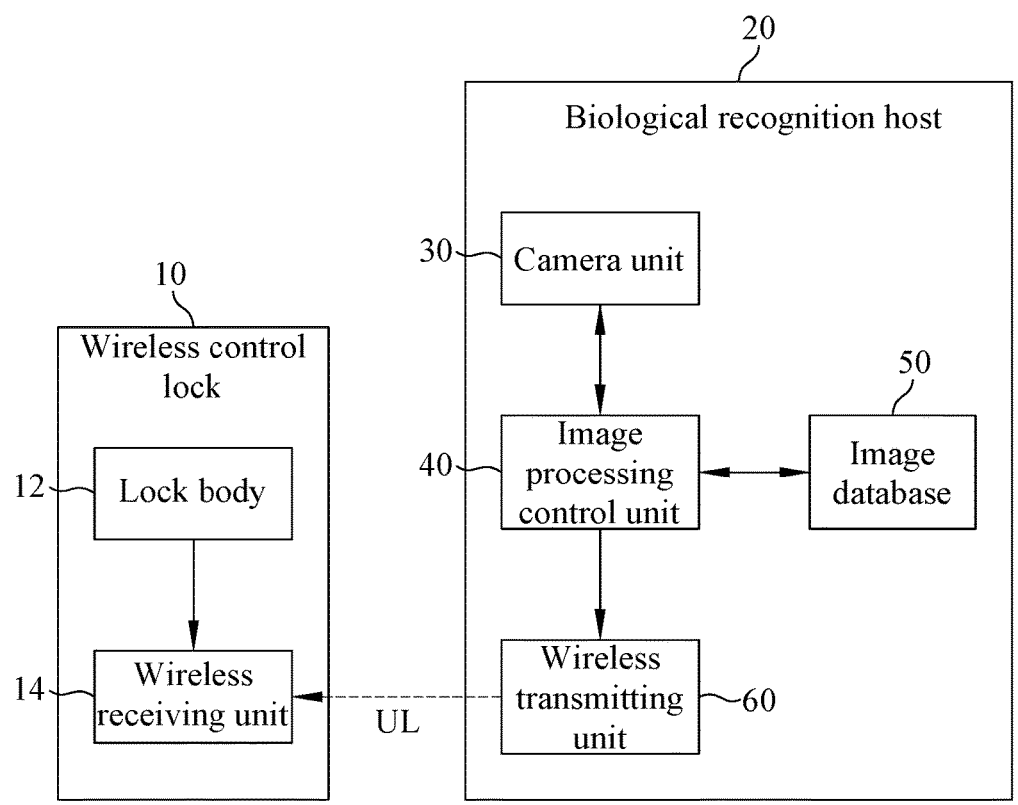
FIG. 1 is a view showing a biological recognition lock system according to a first embodiment of the present invention.

Please refer to FIG. 1 illustrating the biological recognition lock system according to the first embodiment of the present invention. As shown in FIG. 1, the biological recognition lock system 1 according to the first embodiment of the present invention generally comprises a wireless control lock 10 and a biological recognition host 20, and the biological recognition host 20 employs a wireless unlock signal UL to unlock or open the wireless control lock 10 in a wireless manner.

Specifically, the wireless control lock 10 comprises a lock body 12 and a wireless receiving unit 14, and the wireless receiving unit 14 is electrically connected to the lock body 12 for receiving the wireless unlock signal UL to switch a lock closed state of the lock body 12 to an unlock open state. In other words, the wireless receiving unit 14 opens the lock body 12 according to the wireless unlock signal UL. For example, the wireless control lock 10 is configured on a door or wall for entry access control.

In addition, the biological recognition host 20 comprises a camera unit 30, an image processing control unit 40, an image database 50 and a wireless transmitting unit 60, and the camera unit 30, the image processing control unit 40 and the wireless transmitting unit 60 are accommodated in a shell body (not shown) for insulation and protection. The image processing control unit electrically connected to the camera unit, the image database and the wireless transmitting unit. The image database 50 stores a plurality of recognition images for comparison, and the image processing control unit 40 is electrically connected to the camera unit 30, the image database 50 and the wireless transmitting unit 60 for controlling the operation.

Figure 2:
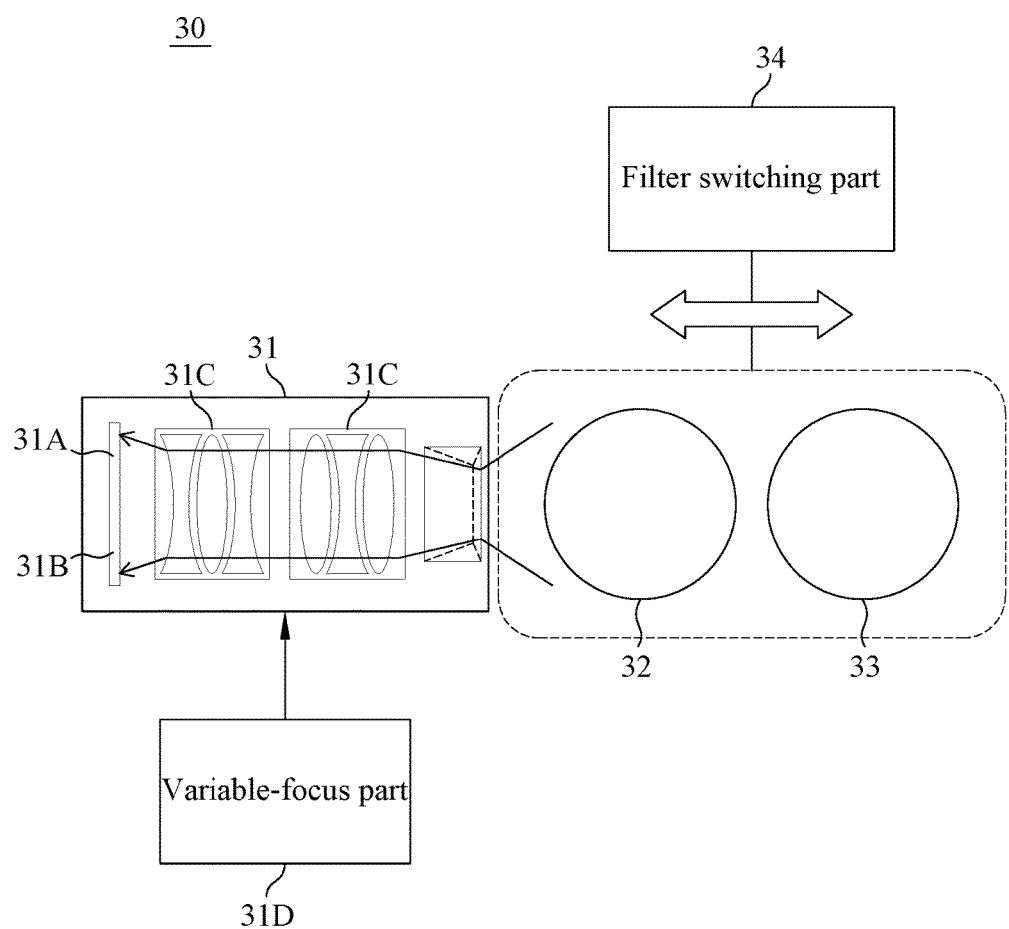
FIG. 2 is a view showing a camera unit of the biological recognition lock system of the first embodiment.

Further refer to FIG. 2 illustrating the camera unit 30 of the biological recognition lock system 1 of the first embodiment. As shown in FIG. 2, the camera unit 30 comprises a camera module 31, a color filter 32, an infrared filter 33 and a filter switching part 34. The filter switching part 34 switches the color filter 32 or the infrared filter 33 based on a filter switching signal generated by the image processing control unit 40 such that the color filter 32 or the infrared filter 33 selected is configured to align with the camera module 31 and an external image light is incident onto the camera module 31. The camera module 31 comprises color image sensors 31A, infrared image sensors 31B, a zoom lens set 31C and a zoom part 31D. The color image sensor 31A or the infrared image sensor 31B of the camera module 31 senses the image light incident onto the camera module 31 to generate and transmit an image signal.

Specifically, the image processing control unit 40 receives the image signal from the camera unit 30 to perform face recognition and/or further employs the recognition image stored in the image database 50 to perform iris recognition.

More specifically, during the face recognition, the image processing control unit 40 recognizes and determines if the image signal includes a face, like any face aspect. Since the face recognition is well known in the prior arts, the detailed description is thus omitted hereinafter. It is preferred that the image processing control unit 40 is implemented by a central processing unit (CPU), a microprocessor or a field programmable gate array (FPGA).

Furthermore, during the face recognition and/or iris recognition, the image processing control unit 40 controls the zoom part 31D to adjust a focal length of the zoom lens set 31C for the image signal to focus. Also, a function of optical zoom in/out for the image signal is implemented through a zoom in/out process.

In particular, when the image processing control unit 40 performs the face recognition, the filter switching signal is used to select the color filter 32 or the infrared filter 33 for the camera module 31, and when the iris recognition is performed, the infrared filter 33 is selected through the filter switching signal for the camera module 31.

The recognition images stored in the image database 50 are provided to the image processing control unit 40 for the iris recognition and used to compare with the image signal, and when the image signal matches any one of the recognition images, an unlock signal is generated and transmitted. Then, the wireless transmitting unit 60 receives the unlock signal to generate and wirelessly transmit the wireless unlock signal UL to the wireless control lock 10. The wireless receiving unit 14 of the wireless control lock 10 then receives the wireless unlock signal UL to unlock or open the lock body 12, thereby implementing the object of wirelessly open the wireless control lock 10.

Figure 3:
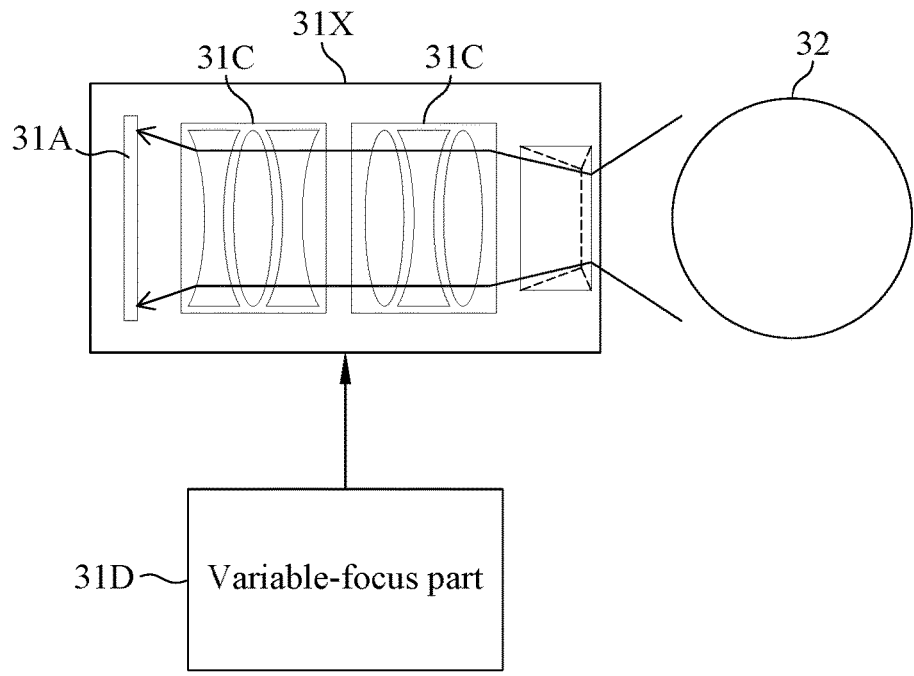
FIG. 3 is a view showing a camera unit of a biological recognition lock system according to a second embodiment of the present invention.
Figure 3:
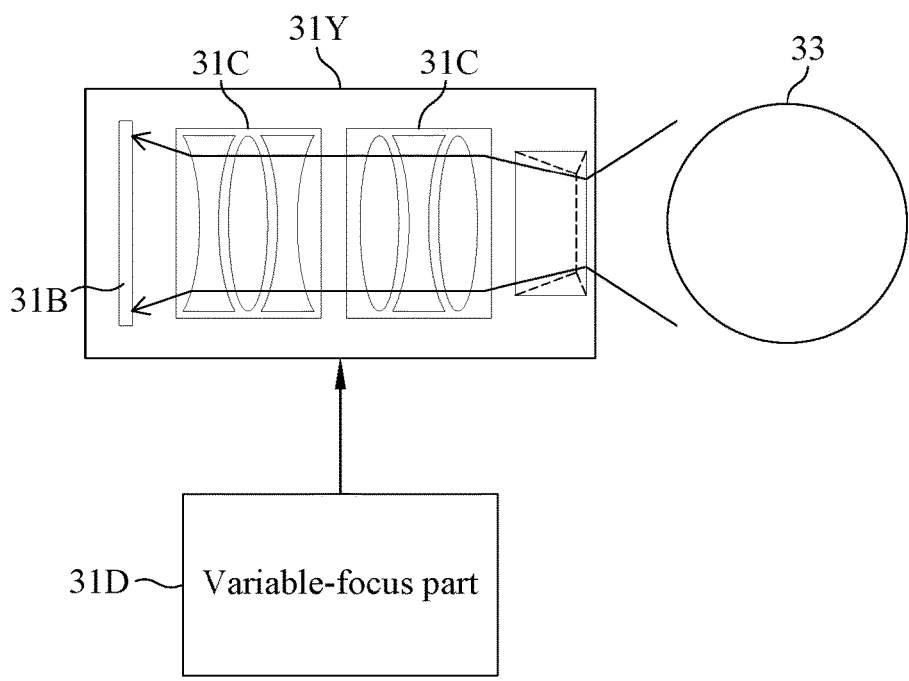

Moreover, refer to FIG. 3 illustrating the camera unit of the biological recognition lock system of the second embodiment. It should be noted that the biological recognition lock system of the second embodiment is similar to the biological recognition lock system of the first embodiment in FIG. 1. One of the primary differences is that the camera unit 30 of the second embodiment in FIG. 3 comprises at least two camera modules such as a color camera module 31X and an infrared camera module 31Y, instead of a single one camera module 31 included in the camera unit 30 of the first embodiment. Especially, the camera unit 30 of the second embodiment does not comprise the filter switching part 34 of the first embodiment.

In addition, the camera unit 30 of the second embodiment still comprises the color filter 32 and the infrared filter 33, but the color filter 32 and the infrared filter 33 align with the color camera module 31X and the infrared camera module 31Y, respectively. Thus, the external image light passes through the color filter 32 and the infrared filter 33 and is incident onto the color camera module 31X and the infrared camera module 31Y, respectively.

The above color camera module 31X comprises color image sensors 31A, a zoom lens set 31C and a zoom part 31D, and similarly, the infrared camera module 31Y comprises infrared image sensors 31B, a zoom lens set 31C and a zoom part 31D. Therefore, the image light incident onto the color camera module 31X or the infrared camera module 31Y is sensed by the color image sensors 31A and the infrared image sensors 31B to generate an image signal, respectively.

Accordingly, the image processing control unit 40 receives the image signal to perform face recognition and/or iris recognition. It should be noted that the image processing control unit 40 specifically employs the color camera module 31X and/or the infrared camera module 31Y for the face recognition, and the infrared camera module 31Y for the iris recognition.

Since the other elements of the second embodiment are similar to those of the first embodiment, the detailed description is thus omitted hereinafter.

More specifically, during the face recognition and/or the iris recognition, the image processing control unit 40 of the first and second embodiment performs a treatment of digital zoom in/out (or digital zoom in/out) on the received image signal. Particularly, the image processing control unit 40 controls the optical zoom in/out treatment and the digital zoom in/out treatment based on a focal distance and a moving speed of the image signal so as to optimize image quality to have enough image resolution and greatly increase correctness of the face recognition and the iris recognition.

Also, when the image processing control unit 40 of the first embodiment performs the face recognition, the color filter 32 is selected. In other words, the image with visible light is used to determine if the image signal is or has a face image. Alternatively, if the image signal has brightness lower than a preset value (for example, the sunlight or the lamp light is weak), indicating insufficient intensity, the infrared filter 33 is selected instead of the color filter 32.

Similarly, when the image processing control unit 40 of the second embodiment performs the face recognition, the image signal from the color camera module 31X is selected, but if the image signal from the color camera module 31X has lower brightness than a preset value, the image signal from the infrared camera module 31Y is selected to improve reliability of recognition.

From the above mention, one of the primary aspects of the present invention is that the biological recognition host wirelessly opens the wireless control lock to implement the object of biological recognition lock. In particular, the image processing control unit of the biological recognition host performs the face recognition to determine if the image signal has or is a face image, and then performs the iris recognition to determine if the image signal matches any one of the recognition images previously stored in the image database so as to determine identity is authorized. Therefore, the present invention greatly improves correctness of recognition, and is very applicable to the places or occasions, which need high quality of entry access control.

Although the present invention has been described with reference to the preferred embodiments, it will be understood that the present invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. A biological recognition lock system, comprising:
a wireless control lock comprising a lock body and a wireless receiving unit, the wireless receiving unit electrically connected to the lock body for wirelessly receiving a wireless unlock signal to switch a lock closed state of the lock body to an unlock open state; and
a biological recognition host comprising a camera unit, an image processing control unit, an image database and a wireless transmitting unit, the camera unit, the image processing control unit and the wireless transmitting unit accommodated in a shell body for insulation and protection, the image processing control unit electrically connected to the camera unit, the image database and the wireless transmitting unit, the image database storing a plurality of recognition images,
wherein the camera unit comprises a camera module, a color filter, an infrared filter, and a filter switching part,
the filter switching part switches the color filter or the infrared filter based on a filter switching signal generated by the image processing control unit so as to align with the camera module and cause an image light incident onto the camera module,
the camera module comprises color image sensors, infrared image sensors, a zoom lens set, a zoom part, and an optical/digital zoom mechanism,
the color image sensors or the infrared image sensors generate an image signal after sensing the image light incident onto the camera module,
the image processing control unit receives the image signal to perform face recognition and/or iris recogni- tion and control the zoom part to adjust a focal length of the zoom lens set for the image signal to focus, the image signal is further processed by a zoom in/out process to implement an optical zoom treatment, wherein while the face recognition is performed, the filter switching signal is used to select the color filter or the infrared filter, wherein while the iris recognition is performed, the filter switching signal is used to select the infrared filter, and wherein the recognition images stored in the image database are provided for the iris recognition to compare with the image signal, an unlock signal is generated and transmitted when the image signal matches any one of the recognition images and the wireless transmitting unit receives the unlock signal to generate and wirelessly transmit the wireless unlock signal to the wireless receiving unit of the wireless control lock , and wherein the image processing control unit selects the infrared filter when the face recognition is performed and brightness of the image signal is lower than a preset value.

2. A biological recognition lock system, comprising:

a wireless control lock comprising a lock body and a wireless receiving unit, the wireless receiving unit electrically connected to the lock body for wirelessly receiving a wireless unlock signal to switch a lock closed state of the lock body to an unlock open state; and a biological recognition host comprising a camera unit, an image processing control unit, an image database and a wireless transmitting unit, the camera unit, the image processing control unit and the wireless transmitting unit accommodated in a shell body for insulation and protection, the image processing control unit electrically connected to the camera unit, the image database and the wireless transmitting unit, the image database storing a plurality of recognition images, wherein the camera unit comprises at least two camera modules, a color filter, an infrared filter and a filter switching part, the at least two camera modules comprises at least one color camera module and an infrared camera module, the color filter and the infrared filter align with the color camera module and the infrared camera module , respectively, such that an image light passing through the color filter and the infrared filter, respectively, is incident onto the color camera module and the infrared camera module, wherein the color camera module comprises color image sensors, a zoom lens set and a zoom part, the infrared camera module comprises infrared image sensors, a zoom lens set and a zoom part, the image light incident onto the color camera module or the infrared camera module is sensed by the color image sensors and the infrared image sensors to generate an image signal, respectively, the image processing control unit receives the image signal to perform face recognition and/or iris recognition, wherein the zoom part is controlled to adjust a focal length of the zoom lens set for the image signal to focus, the image signal is further processed by a zoom in/out process to implement an optical zoom in/out treatment, wherein the image processing control unit employs the image signal from the color camera module and/or the infrared camera module to perform the face recognition, wherein the image processing control unit employs the image signal from the infrared camera module to perform the iris recognition, and wherein the recognition images stored in the image database are provided for the iris recognition to compare with the image signal, an unlock signal is generated and transmitted by the image processing control unit when the image signal matches any one of the recognition images, and the wireless transmitting unit receives the unlock signal to generate and wirelessly transmit the wireless unlock signal to the wireless receiving unit of the wireless control lock, and wherein the image processing control unit selects the image signal from the infrared camera module when the face recognition is performed and brightness of the image signal from the color camera module is lower than a preset value.

3. The biological recognition lock system as claimed in claim 1, wherein the image processing control unit processes the image signal through a digital zoom treatment when the face recognition and/or the iris recognition is performed.

4. The biological recognition lock system as claimed in claim 2, wherein the image processing control unit processes the image signal through a digital zoom treatment when the face recognition and/or the iris recognition is performed.

5. The biological recognition lock system as claimed in claim 3, wherein the image processing control unit controls the optical zoom treatment and the digital zoom treatment based on a moving speed of the image signal.

6. The biological recognition lock system as claimed in claim 4, wherein the image processing control unit controls the optical zoom treatment and the digital zoom treatment based on a moving speed of the image signal.

7. The biological recognition lock system as claimed in claim 1, wherein the image processing control unit selects the color filter when the face recognition is performed.

8. The biological recognition lock system as claimed in claim 2, wherein the image processing control unit selects the image signal from the color camera module when the face recognition is performed.

9. The biological recognition lock system as claimed in claim 3, wherein the image processing control unit is implemented by a central processing unit (CPU), a microprocessor or a field programmable gate array (FPGA).

10. The biological recognition lock system as claimed in claim 4, wherein the image processing control unit is implemented by a central processing unit (CPU), a microprocessor or a field programmable gate array (FPGA).

* * * * *